L. L. LANGSTROTH.
Bee Hive.
No. 1,484. Reissued May 26, 1863.
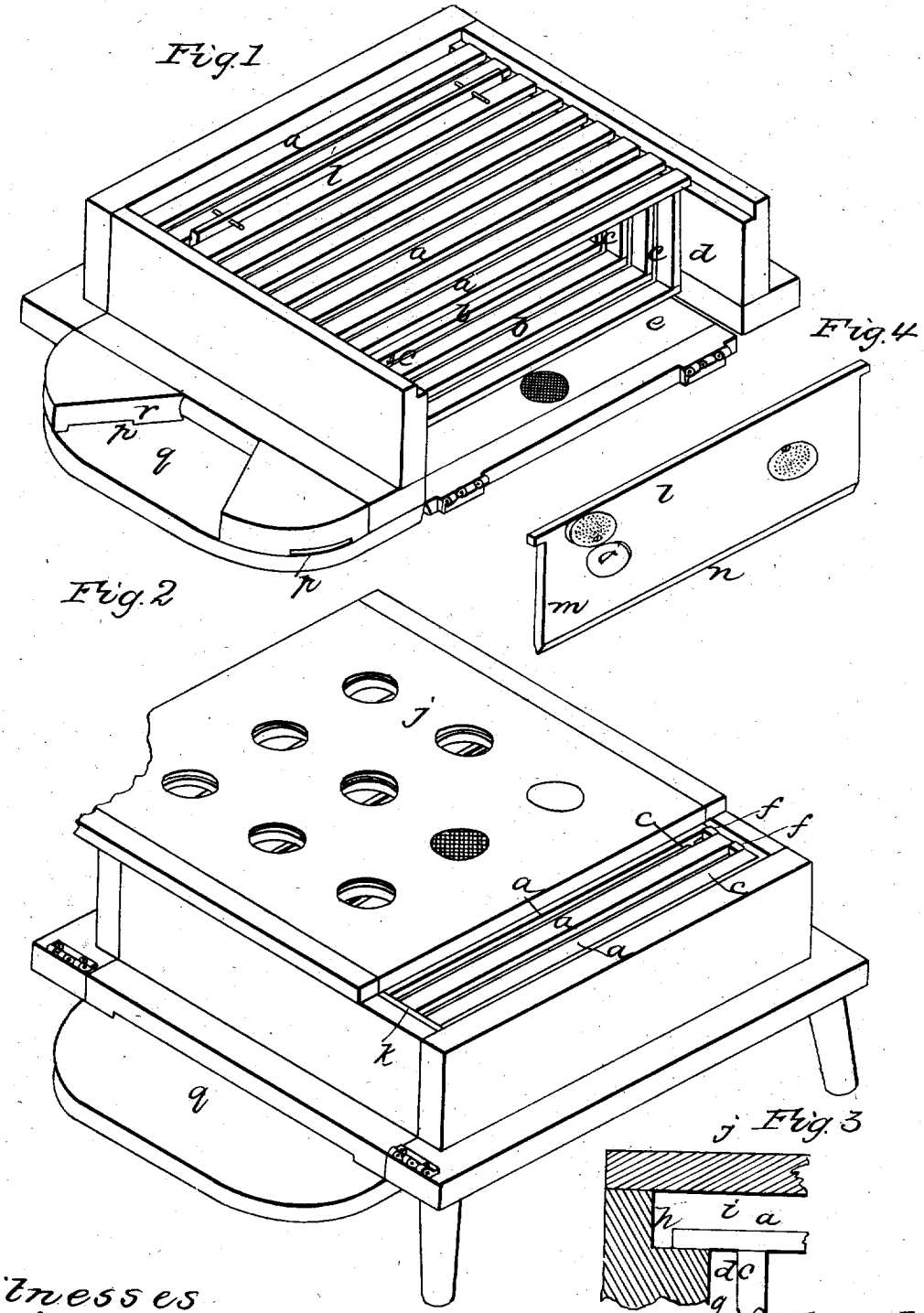
Witnesses
G. H. Smith
J. H. Phillips.
Inventor
L. L. Langstroth.
N. PETERS, Photo-Lithographer, Washington, D. C.

UNITED STATES PATENT OFFICE.

LORENZO L. LANGSTROTH, OF OXFORD, OHIO.

IMPROVEMENT IN BEE-HIVES.

Specification forming part of Letters Patent No. 9,300, dated October 5, 1852; Reissue No. 1,184, dated May 26, 1863.

*To all whom it may concern:*

Be it known that I, L. L. LANGSTROTH, of Oxford, in the county of Butler, in the State of Ohio, have invented a new and Improved Mode of Constructing Bee-Hives; and I do hereby declare that the following is a full and exact description thereof, reference being had to the accompanying drawings, and to the letters of reference marked thereon.

The nature of my invention consists, first, in improving the construction and arrangement of the movable comb-frames of bee-hives so as (*a*) to increase greatly the ease and safety of all necessary manipulations with such framss, (*b*) to enable the apiarian to obtain from movable-frame hives the largest yield of surplus honey in the most convenient, beautiful, and salable receptacles and (*c*) to enable the timid and inexperienced to remove the spare honey from such hives with the least danger to themselves; second, in providing hives having bars or slats with increased facilities for the storage of surplus honey; third, in furnishing increased facilities for enlarging or contracting at will the size of movable-frame hive; fourth, in so arranging the entrances to hives as to give the bees greater protection against the bee moth and its larvæ and against robbing bees.

*Movable comb frames.*—The movable frames which I have invented are so constructed and arranged in the hive or case as to remedy what I regard as great defects in previous inventions.

Figure 1 shows the case with one side and several frames removed to exhibit the way the frames are constructed and arranged. *a* is the top of a frame, *b* the bottom, and *c c* the sides. Each of these strips is about one inch wide and of sufficient thickness to give, when they are fastened together, a proper stiffness to the frame. The sides *c c* are kept away from *d*, the front and rear walls of the case, and the bottom *b* from *e*, the bottom of the case, about three-eighths of an inch, or far enough to give a free bee passage, so that the bees will not cement with propolis these parts of the frame to the case, and so that no lurking-places inaccessible to them will be left for the bee-moth or its larvæ. If the spaces between the frames and the case are much greater than three-eighths of an inch, the bees, when honey is plenty, will fill them with combs large enough to interfere greatly with the easy manipulation of the frames. As bees do not ordinarily attach the bottom of their combs to the bottom of the hive, the bottom strip, *b*, (see second edition of M. Debeauvoy's "Guide de l'apiculteur," Angers, 1847,) may, when desired, be placed higher up. Any desired number of such frames may be suspended upon rabbets made in the front and rear walls of the hive, so as to be kept about half an inch apart from each other. (See Figs. 1 and 2.) If the apiarian prefers to confine his frames to the same distances apart, their projecting tops may be placed between blocks fastened upon the rabbets, as shown at *f f*, Fig. 2, or between "gains," like those of Wm. A. Munn, (see his pamphlet on the bar and frame hive, London, 1851,) or small nails, or anything equivalent, (see Debeauvoy, second edition, p. 87,) may be fastened into their tops or sides, which will prevent the frames from crowding too closely together. As any device which keeps the frames at the same invariable distances apart from each other increases the difficulty of removing them from and returning them to the case, and gives no facilities when the bees build their combs waving or thicker in some parts than others for regulating at will the distances between the combs, so as to alter their relative position in the hive, or to make necessary interchanges of combs between different hives, I very much prefer that the tops of the frames, as they rest upon the rabbets, (see Fig. 1,) should have a lateral motion, so as to enable the apiarian to regulate at will the distances between the combs.

Fig. 3 is a sectional view showing more clearly the space *g* between the sides of the frame and the case, also a space, *h*, between the projecting top of the frame and the back of the rabbet, which prevents the bees from cementing this top to the back of the rabbet, and allows a motion of the frame from front to rear, or vice versa, to break the cement which fastens the frame to the rabbets on which it rests, without the necessity of a lateral motion, which, when used for this purpose, might crush the combs or the bees.

In Fig. 2 is shown a small strip, *k*, which may be placed over the tops of the frames when th. are confined between blocks again, and are used in combination with the shallow air-space, (see *i*, Fig. 3,) the object of which air space is subsequently described. Such a strip will prevent the bees from cementing the tops of the frames in such a manner as to interfere seriously with their easy removal.

The power of regulating at will the distances between the comb-frames not only facilitates the necessary interchanges of combs, but allows the frames to be safely lifted out of the case, and by gently pushing the tops of several adjoining frames (after the cement is broken) a little closer together sufficient room may be obtained for the safe removal of one frame, after which the others can be readily taken out. Where close-fitting tops like those of Debeauvoy (see edition of 1851) are used, and the frames are removed from a side door, it is necessary, in order to reach any particular comb, to loosen, if not to remove, all between it and the side door, whereas by my arrangement a comb may often be examined with far less disturbance of the other combs.

While I regard the aforesaid self-regulating power as my invention and much prefer to give it to all my frames, I do not, by any means, limit my claims to frames thus constructed and arranged, being fully aware that many apiarians prefer to confine the frames to the same distances apart.

To secure the regular building of a single comb in each frame, pieces of worker-comb may be fastened in the frames, as guides to the bees. The spaces left between the tops of my frames contribute likewise to the same end.

While I have described what I regard as the best shape for frames and the best mode of inserting them in the hive, it is obvious that both shape and mode of insertion may be varied, provided the new and important features which I have described are embraced in the variations.

What I regard as a very serious defect in all hives constructed on the Huber, Munn, and Debeauvoy principles is, that they make no provision for the removal of the spare honey, except by opening the main hive and taking out the frames on which the bees have stored it, thus giving no facilities for timid or inexperienced persons to secure the surplus honey, or to any persons to secure it in convenient and attractive receptacles in which it can be safely carried to market in the comb.

The construction and arrangement by which I keep the tops of my frames separated from each other throughout the whole (see Fig. 1) or a portion of their length (see Fig. 2) not only greatly facilitates all necessary manipulations with the frames, but enables me easily to remedy what I regard as a radical defect of previous movable-frame hives, by allowing the bees to pass between the tops of the frames into surplus-honey receptacles of any size or shape. These receptacles, having suitable apertures, may be placed directly over the frames, or a honey-board may be placed on the frames having suitable apertures for admitting the bees through the openings between the tops of the frames into any kind of receptacles placed upon this board, (see Bevan, pages 86, 87, 94;) or any of the methods in previous use may be employed by which surplus-honey receptacles were used in combination with hives having slats or bars. I have, however, invented a much better way of securing the surplus honey, which I shall now describe.

*Shallow air-chamber or air-space above the frames or bars.*—The bees, before they pass into the surplus-honey receptacles, enter an air-space about half an inch deep, or just shallow enough to prevent them from occupying it with large combs. Figs. 1, 2, and 3 show the way in which I prefer to construct this air-space. The rabbets on which the movable frames or bars rest are made deep enough to leave this space above the frames or bars. (See *i*, Fig. 3.) Over the frames or bars I usually place a cover or honey-board, *j*, Fig. 2, where it is shown partially pushed aside, and on this cover I set the spare-honey receptacles, the honey-board having apertures or openings of any size or shape most convenient for admitting the bees to these receptacles. The apertures or bee-passages in the honey-board may be made without being liable to be closed by the bees, as they so frequently are in hives which have not this shallow air-space. It will be seen that the bees can pass into this shallow chamber from between all the ranges of comb, and from the front and rear walls, *d*, of the hive, and the sides *c c*, Figs. 1, 2, and 3, of the frames, without even passing through the combs at all, and that they can pass from the shallow chamber into any of the honey-receptacles without, as in other hives, losing much time in the height of the honey-harvest by crowding through populous combs or contracted passages. This shallow chamber, while it greatly facilitates the storage of honey in large receptacles, is specially adapted to securing it in small ones, which usually meet with the readiest sale:

First. The building of comb requires the bees to maintain a high temperature, and they work to the best advantage when they can economize their animal heat; but this they cannot do in small receptacles, which communicate with the hive through such appertures as are usually made in its top, such apertures not admitting freely the heat and odor from the main colony, and the bees in a small receptacle being too few to keep up the requisite temperature. The shallow chamber, however, like the part of a room nearest the ceiling, is, in the storing season, always full of the warmest air of the hive, thus aiding to keep the small receptacles full of the same. If large openings or bee-passages are made in hives having no shallow chamber for the purpose of giving a freer admission into small receptacles of the heat and odor of the hive, the bees often connect the combs of the surplus receptacles with those of the main hive, making it difficult to remove the surplus honey in a proper condition, and the queen being thus able to travel over the combs into the receptacles is much more liable to enter them for breeding than she is where the interposition of the shallow air-space would require her to leave the combs.

Second. Bees always desire to work in large numbers, so that they can easily intercommunicate with each other, and the common arrangement for inducing them to work in small receptacles is opposed to this instinct, whereas the shallow chamber affords a place of repose for multitudes of bees engaged in secreting the wax to be used in the surplus receptacles, and as a succession of bees are thus constantly ascending and descending they work in small receptacles with scarcely more isolation and with almost as much rapidity as though they were merely filling the upper part of their main hive. If sufficient storage space, properly connected with the main hive, is given to the bees, their propensity to swarm may be greatly checked.

In the Huber, Munn, and Debeauvoy hives, where the surplus honey is taken by removing frames from the main hive, its value is often inpaired by being mixed with brood or pollen, it cannot be easily taken away by the timid or inexperienced, and after all it is not secured in a form adapted to transportation in the combs, whereas in my hive the surplus may be removed from the upper receptacles, without any danger to the timid or inexperienced, by pushing a slide between the receptacles and the holes in the honey-board. The bees, finding their communication with the main hive closed, will in a few moments gorge themselves with honey, (in which state they are not disposed to act on the offensive,) and when allowed to fly will peaceably return to their hive. A little smoke blown upon them will produce the same effect, and the receptacles may then be removed without any slide.

This shallow chamber answers other highly-important purposes: (*a*) It prevents the bees from cementing the cover or honey-board to the tops of the frames or bars, thus enabling it to be more easily removed when access is wanted to the combs; (*b*) it enables the cover to be put over the frames or bars with much less danger of crushing bees than if it rested directly on their tops; (*c*) it permits the bees, when the cover is on, to pass from comb to comb above the tops of the frames or bars; (*d*) it aids to keep a feeder in cool weather filled with the warmest air of the hive; (*e*) it gives a dead-air space between the combs and the cover, thus more effectually guarding the bees against extremes of heat and cold; (*f*) it enables us to give the bees better protection against dampness in their hives, as by leaving the apertures in the cover open in cold weather there is a much freer escape of moisture than when the cover rests flat upon the frames or bars.

It is obvious that the mode of getting this dead-air space above the frames or bars may be varied, and that it may be advantageously used over any kind of frames or bars which are so constructed and arranged as to allow the bees to pass between their tops.

Having already described the manner in which I prefer to construct my movable frames and to insert them in the hive, it will be seen, Figs. 1 and 3, that when they are used in combination with the shallow chamber they may be entirely separated from each other, and also (except at the necessary points of support) from the top *j*, sides *d*, and bottom *e* of the case containing them, thus giving the bees very little opportunity to interfere with their easy removal by cementing them fast either to each other or to the case, while at the same time the dead-air space all around them protects them to an unusual degree from atmospheric changes or extremes.

*Movable partition or divider.*—To be able to adjust the size of the hive to the wants of large or small colonies, I use a movable partition or divider, which also enables me to unite more safely different colonies, and to perform other important manipulations. Fig. 4 shows the shape which I prefer to give to this divider, which may be made of wood or any suitable material. The top *l* is made to project so as to rest upon the rabbets, and should fit up close against *j*, the honey-board or cover over the frames, while the sides *m m* and bottom *n* should also fit close against the case, thus enabling the apiarian to divide the hive into separate compartments. In Fig. 1 a divider is shown inserted between two frames and having a top, *l*, too short to rest upon the rabbets. Small holes *o o*, Fig. 4, may be made in the divider and covered with wire-cloth or any suitable material which will allow colonies put into different compartments to have the same odor, when they may be more safely united. By inserting this divider a little distance from one side of the hive it may be easily moved away laterally from the face of the first comb, so that the divider may be safely taken from the hive, leaving at once ample room for removing the frame containing this comb, without crushing its surface against the next comb.

Being aware that a divider very similar to the one above described has been used in a hive having slats or bars, I do not claim its use in such hives; and being also aware that the combination of a divider with movable frames inserted in a case is not new, I distinctly point out as my invention the combination of movable frames having their tops wholly or partially separated from each other, in the manner and for the purposes that have been set forth, with a divider so constructed that when it is inserted in the hive it is not confined to certain positions by gains or any similar device, as are the frames of Munn or those shown in Fig. 2, but has a free, lateral motion, by which it may be properly inserted anywhere in the case.

*Combined moth and worm trap and entrance-regulator.*—For trapping the worms and excluding the moths which infest the hive, I have invented movable blocks, which also enable the apiarian to regulate at will the entrance to the hive without perplexing the bees, and to protect a colony against robbing bees. Fig. 1 shows these blocks placed upon a projecting alighting-board. On their under sides cavities may be made for holding small pieces of old comb, the refuse from the bottom board, or any material in which the moth will lay her eggs. *p p* are entrances for the moth to pass to these cavities, and are made too small to admit a bee. If the moth alights anywhere upon the alighting-board *q* of a prosperous colony, she will glide to these openings, instead of passing to the bee-entrance, over a surface which, from the shape of the blocks, is constantly narrowing, so as to be more and more easily guarded by the bees. The full-grown worm, finding it difficult, in a strong hive, to spin its cocoon for changing into a moth, often leaves the hive for this purpose, and will crawl into the openings *p p*, or into grooves placed anywhere so as to be protected from the bees by the trap, just as it does into the crevices between the bottom boards and sides of ordinary hives. These blocks should be frequently inspected during the moth season, and the eggs and worms destroyed. These blocks can be made to serve other highly-important ends: (*a*) By moving them closer together the bee-entrance may be so contracted that robbing bees, as well as moths, will find it difficult to force a passage to the hive; (*b*) the shape of these blocks at all times readily directs the bees to the entrance of the hive, which may be enlarged or contracted without at all confusing them, for, alighting upon the surface *q*, they are kept in the true direction by *r*, the edge of the blocks, till they come to the entrance, whereas the usual mode of altering the entrances often causes them to lose valuable time before they become familiar with the new arrangement, for, although bees return to their home with unerring precision from their flights aboard, unless the entrances are judiciously arranged they cannot readily find them, even after they have alighted upon the hive. This is more especially the case where the entrances are altered. These blocks may be constructed in various ways and yet made to answer substantially the aforesaid purposes, provided their triangular shape is retained. Simple triangular blocks will answer every purpose as a protection against robbers and a guide to the alighting bees.

To prevent all danger of confounding the features which I have invented with other movable comb-frames, I would state, first, that I do not claim as my invention movable comb-frames whose tops and sides are close-fitting to each other, like the tops and sides of the Huber leaves; second, that I do not claim the separation by suitable distances from each other of the top, sides, and bottoms of movable frames, when, like the Debeauvoy frames of 1847, both the sides and tops are made close-fitting to the sides and tops of the case containing them; third, that I do not claim the separation by suitable distances of the sides and bottoms of movable frames, as well from each other as from the case, when, like the Debeauvoy frames of 1851, the tops of such frames are close-fitting to each other; fourth, that I do not claim, broadly, constructing the tops of movable frames too narrow to furnish room, as the Huber and Debeauvoy tops do, both for the attachment of the combs and the necessary bee-passages between them, but confine my claim to frames having the aforesaid narrow tops, provided either that they are so arranged in the case that the spaces between these tops are not closed by slides, like those of Munn, or by any equivalent device; or that the spaces between the sides of these frames and the case are too shallow to permit the bees to fill them with combs large enough to interfere seriously with the manipulations of the frames.

What I claim as my invention, and desire to secure by Letters Patent, is—

1. Constructing and arranging the movable comb-frames of bee-hives in such a manner that when placed in the hive or case they have not only their sides and bottoms kept at suitable distances from each other and from the case, substantially in the manner and for the purposes described, but have likewise their tops separated from each other throughout the whole or a portion of their length, substantially in the manner and for the purposes set forth.

2. Constructing and arranging movable frames in such a manner that when they are inserted in the hive the distances between them may be regulated at will, substantially in the manner and for the purposes described.

3. Constructing movable frames and arranging them in the hive in such a manner that the bees can pass above them into a shallow chamber or air-space, substantially in the manner and for any or all of the purposes set forth.

4. The shallow chamber, in combination with the top bars of the laterally-movable frames, or their equivalents, and with the perforated honey-board, upon which to place surplus-honey receptacles, substantially as and for the purposes set forth.

5. A movable partition or divider, substantially as described, when used in combination with movable frames, substantially in the manner and for the purposes described.

6. The use of movable blocks for excluding moths and catching worms, so constructed and arranged as to increase or diminish at will the size of the bee-entrance, substantially in the manner and for the purposes set forth.

L. L. LANGSTROTH.

Witnesses:
A. HEDDAW,
J. S. MCKEUN.